March 10, 1970 J. M. SEGEL 3,499,739

BIMETALLIC TOKEN WITH ANNULAR RING HAVING DIFFERENT PERMEABILITY THAN INNER PORTION

Filed April 27, 1966 2 Sheets-Sheet 1

INVENTOR.
JOSEPH M. SEGEL

BY Seidel & Gonda

ATTORNEYS.

INVENTOR.
JOSEPH M. SEGEL
BY Seidel & Gonda
ATTORNEYS.

United States Patent Office 3,499,739

Patented Mar. 10, 1970

3,499,739

BIMETALLIC TOKEN WITH ANNULAR RING HAVING DIFFERENT PERMEABILITY THAN INNER PORTION

Joseph M. Segel, Merion, Pa., assignor to The Franklin Mint, Inc., Yeadon, Pa., a corporation of Pennsylvania Filed Apr. 27, 1966, Ser. No. 545,728
Int. Cl. B21k *1/76*
U.S. Cl. 29—191 7 Claims

ABSTRACT OF THE DISCLOSURE

A bimetallic token is comprised of an inner disk joined to an outer annular ring. The disk and ring are comprised of different metallic materials having different magnetic properties in order to permit rapid and accurate authentication of the token. The depth of the ring is greater than the depth of the disk to insure that a raised design on the disk will not hinder stacking of the tokens. The depth difference of the disk and ring also functions to effectively conceal the disk-ring junction.

This invention relates to a bimetallic token that may be easily and quickly tested for authenticity.

In accordance with the present invention a novel bimetallic token, having metals of predetermined properties is provided. Moreover, a particular token testing apparatus is disclosed.

It therefore is a general object of the present invention to provide a new and unobvious bimetallic token.

It is yet another object of the present invention to provide a new and unobvious bimetallic token having predetermined magnetic properties.

Yet another object of the present invention is to provide a new and unobvious bimetallic token having unique structural features.

Other objects will appear hereinafter.

For the purpose of illustrating the invention, there is shown in the drawings a form which is presently preferred; it being understood, however, that this invention is not limited to the precise arrangements and instrumentalities shown.

Referring now to the drawings, wherein like numerals indicate like elements, there is shown in FIGURE 1 a perspective view of the token designated generally as 10.

Figure 1:
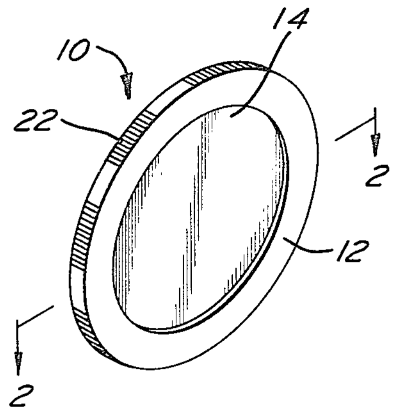
FIGURE 1 is a perspective view of the bimetallic token in accordance with the present invention.

The token 10 comprises an outer ring 12 and an inner disc 14. The ring 12 has a generally planar obverse surface 16 and a generally planar reverse surface 18 parallel thereto. The outer rim 20 of ring 12 is cylindrical. Thus, the periphery of the token 10 is circular.

Token 10 is provided with a plurality of projections 22 extending radially from the surface of rim 20. The projections 22 are elongated in the direction perpendicular to the surfaces 16 and 18. The projections 22 are arranged in equal numbered groups around the rim of token 10. By varying the number of groups and the number of spacings and projections per group, it is possible to provide identification means for each of the tokens. A more detailed description of the projections is provided in patent application Ser. No. 466,627, filed June 24, 1965, which is incorporated by reference.

The disc 14 is fixed within the annular ring 12. Disc 14 has a planar obverse surface 24 and a planar reverse surface 26 parallel to surface 24. As explained below, disc 14 is metallurgically joined to ring 12.

Figure 2:
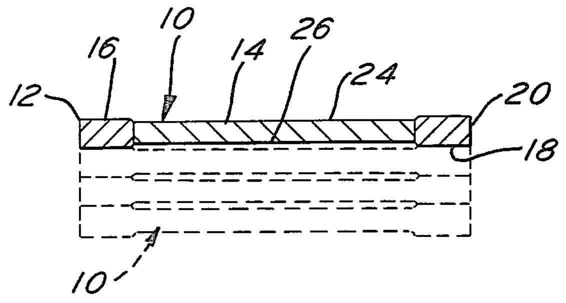
FIGURE 2 is a sectional view of the token illustrated in FIGURE 1 taken along the line 2—2.

The thickness of disc 14 is slightly less than the thickness of ring 12. This effectively hides the joint between the disc and ring by making it seem as if it is a part of the surface design minted into the token. Another advantage of the raised surface adjacent the rim of the token is that it provides ease of stacking. It is intended that the tokens will bear identifying indicia upon the ring and disc surfaces preferably the indicia on the obverse and reverse surfaces of the ring is designed so as to be indented below the surface thereof. On the other hand, it is desirable that the design appearing on the disc obverse and reverse surfaces be embossed or raised. Such raised designs hinder stacking of the tokens. By providing a raised surface adjacent the rim, the effect of the embossed design is eliminated. This is best illustrated in FIGURE 2 where the token 10 is shown with similar tokens illustrated in phantom. It will be noted that the discs 14 stand away from the other discs and define an open space between their surfaces. This open space will provide sufficient clearance for any embossed design on the surfaces of disc 14.

While the ring 12 and disc 14 are both made of metal or metal alloys, it should be noted that the types of metal are different. To detect the presence of the tokens, an apparatus has been invented based upon the differences in the magnetic permeability of the ring and disc. Such an apparatus is described and discussed below in reference to FIGURES 3 and 4.

The token 10 can be made by one of the following processes. Each of the processes involves making a blank with the outer ring area being one material and the inner disc being a different material.

EXAMPLE NO. 1

Using a brushing die, the outer ring is filled with 100% nickel powder and precompacted at three tons per square inch. A preform is then raised to die height, with the core rod retracted to the bottom of the preform. The center cavity is filled with a 95% copper-2.5% tin-2.5% zinc mixture. The whole blank is then finish compacted at twenty tons per square inch. The blank is sintered at 1850° F. for one-half hour in a protective atmosphere, such as hydrogen.

EXAMPLE NO. 2

An outer ring of 100% nickel powder is compacted at ten tons per square inch. An inner disc of 70% copper-30% nickel is compacted at 7.5 tons per square inch. The size of the disc is such that it can be assembled into the inner periphery of the ring to form a single token blank. The assembled blank is then finally compacted at twenty tons per square inch to insure that the disc is well fixed within the ring. The tokens are then sintered at 2050° F. for one-quarter of an hour in a protective atmosphere such as hydrogen.

EXAMPLE NO. 3

Strips of different metals are advanced through punch presses which punch out the outer ring and inner disc. The rings and inner discs, being of dissimilar metals are then pressed together and so retained by a friction fit.

Other combinations of coins can be made using the method. For example, the compositions of the outer ring and inner disc can be switched. Similarly, the precise compositions can be varied. Such variations set the desired electrical properties and also the magnetic or non-magnetic properties of the token.

In the preferred embodiment, the compositions are designed for their magnetic properties. Thus, a combination of a high alloy ring and a low nickel alloy may be used. This assures that the permeability of the ring is substantially higher than that of the disc. By switching the composition of the disc and ring, a high magnetic permeability for the disc and low magnetic permeability for the ring is provided.

It should be understood that other magnetic or electrical properties of dissimilar metals may be used. For example two metals having different resistivities may be used.

Figures 3, 4:
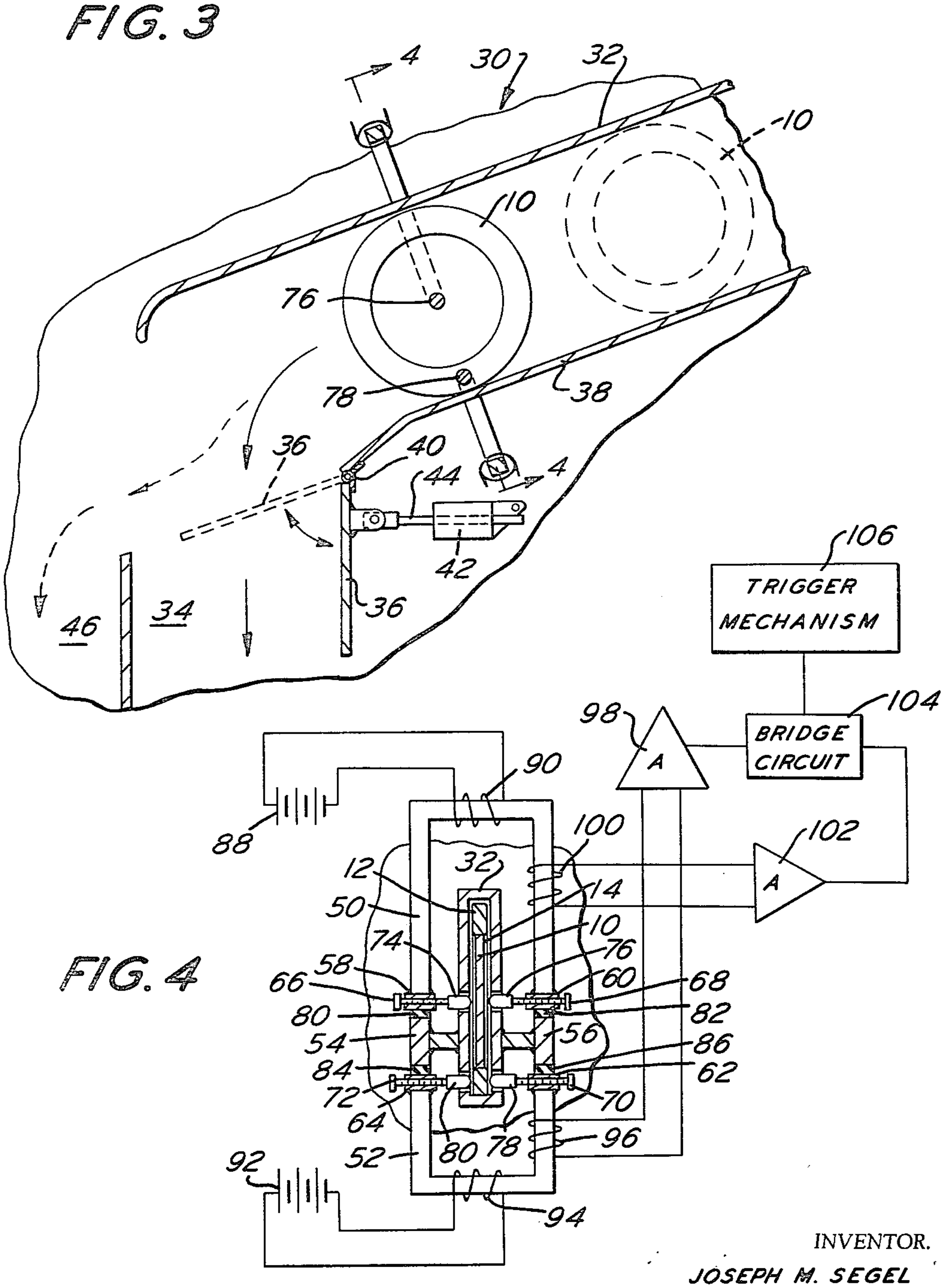
FIGURE 3 is a sectional view of a token receiving and detecting apparatus.
FIGURE 4 is a transverse sectional view of the apparatus shown in FIGURE 3 taken along the line 4—4, and further illustrating the electrical circuitry for the apparatus in schematic form.

Referring now to FIGURES 3 and 4, a detecting apparatus 30 is shown. The apparatus 30 includes a chute 32 down which the token 10 will roll when deposited in a slot (not shown). Chute 32 terminates in an accept-receptacle 34. Receptacle 34 is normally closed by a door 36. In its closed position, door 36 forms a continuation of the bottom wall 38 of chute 32. In its open position, the door 36 is pivoted about the hinge 40 by the reciprocating action of the solenoid 42 which is energized to draw in the actuator 44 pivotally connected to door 36. When door 36 remains in its closed position, as shown in phantom, the token 10 will roll over it and pass into the reject-receptacle 46.

The apparatus for sensing the token 10 and opening door 36 is illustrated in FIGURE 4. The structure comprises a pair of U-shaped magnetic armatures 50 and 52 supported by non-magnetic brackets 54 and 56 connected to the walls of chute 32. Each of the armatures 50 and 52 is made of a magnetic material such as iron or the like. The distal ends of each of the armatures 50 and 52 terminates in a threaded sleeve. Such sleeves are designated as 58, 60, 62 and 64. The threaded sleeves are made of a magnetic material, preferably the same type of material that the armatures 50 and 52 are made from. In order to assure a good magnetic circuit, the sleeves 58–64 are welded to the distal ends of the armatures 50 and 52.

Adjustment screws 66, 68, 70 and 72 extend through the sleeves 58–64 in threaded engagement therewith and terminate in magnetic pole pieces 74, 76, 78 and 80. Preferably, the adjustment screws 66–72 and pole pieces 74–80 are made from a magnetic material which is the same as the material of armatures 50 and 52. As thus constructed, the armatures 50 and 52 effectively form horseshoe magnets having adjustable pole pieces.

The armature 50 is separated from the brackets 54 and 56 by non-magnetic insulators 80 and 82. Similarly, insulators 84 and 86 are provided between the armature 52 and brackets 54 and 56. The insulators 80–86 help prevent magnetic interaction between the armatures 50 and 52.

Armature 50 is energized by a source of direct current connected to the coil 90 which induces a magnetic field between the pole pieces 74 and 76. The armature 52 is energized by a source of direct current 92 which is connected to coil 94. Coil 94 induces a magnetic field between the pole pieces 78 and 80.

A coil 96 is wrapped about the armature 52 and connected to an amplifier 98. A second coil 100 is wrapped about the armature 50 and connected to the amplifier 102. Amplifiers 98 and 102 have their outputs connected to a bridge circuit 104 which in turn is connected to a trigger mechanism 106 for actuating the solenoid 42.

The apparatus illustrated in FIGURES 3 and 4 operates as follows:

When each of the direct current sources 88 and 92 is energized, a magnetic field is induced in the armatures 50 and 52. A magnetic field in armature 50 extends across the pole pieces 74 and 76. The magnetic field induced in armature 52 extends across the pole pieces 78 and 80. When no coin is in the chute 32, the permeability of the magnetic circuit through the armatures and their respective pole pieces is fixed. Since the magnetic permeability is fixed, the magnetic flux induced in the circuit remains constant. Accordingly, no current is induced in either of the coils 96 or 100.

However, when a bimetallic token 10 rolls down the chute 32, it passes between pole pieces of each of the armatures 50 and 52. The result is a momentary variation in the permeability of the respective magnetic circuits. The degree of variation depends upon the magnetic permeability of the token. Moreover, the degree of variation in armature 50 is different than the degree in variation in armature 52 because pole pieces 74 and 76 are arranged adjacent the disc portion of the token while pole pieces 78 and 80 are positioned adjacent the ring portion.

The momentary variation in permeability in each of the armature magnetic circuits, results in a variation in flux density, which accordingly induces a current in coils 96 and 100. The current induced in coil 96 is amplified by amplifier 98 and applied to the bridge circuit 104. The current induced in coil 100 is amplified by amplifier 102 and applied to bridge circuit 104.

Since armature 100 will first sense a variation caused by the ring 12 and then a second variation caused by the disc 14, the bridge circuit 104 has been used. The bridge circuit maintains a voltage on trigger mechanism 106 until two voltages of predetermined value are applied to it. Such predetermined voltages will exist when the armatures 50 and 52 sense the disc 14 and ring 12, respectively. When the armature 50 senses a change in permeability due to the passing of ring 12, the trigger mechanism will not be tripped because the required second voltage from armature 52 is not applied to bridge circuit 104.

The output of bridge circuit 104 is a voltage that is applied to the trigger mechanism circuit 106 to hold a transistor or other type of electronic valve in a non-conducting condition. When the correct voltages are applied to bridge circuit 104, the voltage is removed and trigger mechanism 106 becomes operative. The output voltage of trigger mechanism 106 is applied to solenoid 42 which opens door 36.

The magnetic circuits through armatures 50 and 52 can be adjusted by threading the adjustment screws 66–72 toward or away from each other. This in turn would adjust the voltage applied to bridge circuit 104.

Other forms for magnetically testing the bimetallic token can be used. For example the intensity of the magnetic field between the pole pieces can be adjusted to slow the rate of descent of the bimetallic token, due to the magnetic interaction, so that it falls through a predetermined arc at the end of the chute. Should the magnetic properties of a token be at variance with those of the true tokens the arc will be altered and the token discharged.

The present invention may be embodied in other specific forms without departing from the spirit or essential attributes thereof and, accordingly, reference should be made to the appended claims, rather than to the foregoing specification as indicating the scope of the invention.

I claim:

1. A bimetallic token comprising a metallic inner disc, a metallic outer annular ring, said ring being joined to said disc only at the periphery of said disc, said disc being comprised of a material having a predetermined magnetic permeability, and said ring being comprised of a material having a predetermined magnetic permeability different from the magnetic permeability of the material of said disc in order to permit magnetic authentication of said token.

2. A bimetallic token in accordance with claim 1 wherein the magnetic permeability of the material of said ring is higher than the magnetic permeability of the material of said disc.

3. A bimetallic token in accordance with claim 1 wherein the magnetic permeability of the material of said ring is lower than the magnetic permeability of the material of said disc.

4. A bimetallic token comprising a metallic disc in the shape of a right circular cylinder, said disc being comprised of a material having a first predetermined magnetic permeability, an annular outer metallic ring having the shape of a right circular cylindrical shell, said ring being comprised of a material having a second predetermined magnetic permeability, said ring having an inner radius substantially equal to the radius of said disc, said ring having a height greater than the height of said disc, said ring being joined to said disc only at the curved periphery of said disc so that said ring projects above and below the parallel planar surfaces of said disc, said first predetermined magnetic permeability differing from said second predetermined magnetic permeability in order to permit magnetic authentication of said token.

5. A bimetallic token in accordance with claim 4 wherein the material of said outer ring has a higher magnetic permeability than the material of said inner disc.

6. A bimetallic token in accordance with claim 4 wherein the material of said outer ring has a lower magnetic permeability than the material of said inner disc.

7. A bimetallic token in accordance with claim 4 wherein a plurality of spaced apart groups of projections extend radially outward from the outer rim of said ring.

References Cited

UNITED STATES PATENTS

| | | | |
|---|---|---|---|
| 2,372,202 | 3/1945 | Hensel | 29—182.1 |
| 2,401,483 | 6/1946 | Hensel | 29—182.1 |
| 2,490,543 | 12/1949 | Robertson | 29—191.2 |
| 2,665,960 | 1/1954 | Causley | 29—182.1 |
| 2,671,954 | 3/1954 | Lewin | 29—182.1 |
| 2,753,859 | 7/1956 | Barlett | 29—182.1 |
| 2,836,911 | 6/1958 | Priesmeyer | 40—27.5 |
| 2,878,410 | 3/1959 | Millis | 29—195 |
| 2,196,850 | 9/1940 | Bostian | 40—27.5 |
| 2,301,320 | 11/1942 | Phillips. | |
| 2,817,141 | 12/1957 | Toulmin | 29—196.6 |
| 3,368,880 | 2/1968 | Turillon | 29—194 X |
| 3,407,050 | 10/1968 | Trapp | 29—199 |

FOREIGN PATENTS

| | | |
|---|---|---|
| 418,186 | 10/1934 | Great Britain. |

HYLAND BIZOT, Primary Examiner

U.S. Cl. X.R.

29—194, 196.1